US012065869B1

(12) United States Patent
Kendall

(10) Patent No.: US 12,065,869 B1
(45) Date of Patent: Aug. 20, 2024

(54) CONNECTOR SYSTEM, APPARATUS AND METHODS FOR A DOOR FRAME ASSEMBLY

(71) Applicant: Endura Products, LLC, Colfax, NC (US)

(72) Inventor: Adam Kendall, Burlington, NC (US)

(73) Assignee: Endura Products, LLC, Colfax, NC (US)

( * ) Notice: Subject to any disclaimer, the term of this patent is extended or adjusted under 35 U.S.C. 154(b) by 0 days.

(21) Appl. No.: 18/104,416

(22) Filed: Feb. 1, 2023

Related U.S. Application Data

(63) Continuation of application No. 17/195,135, filed on Mar. 8, 2021, now Pat. No. 11,572,734, which is a continuation of application No. 16/561,116, filed on Sep. 5, 2019, now Pat. No. 10,941,606.

(60) Provisional application No. 62/727,790, filed on Sep. 6, 2018.

(51) Int. Cl.
*E06B 1/52* (2006.01)

(52) U.S. Cl.
CPC .................................... *E06B 1/524* (2013.01)

(58) Field of Classification Search
CPC . E06B 1/524; E06B 1/526; E06B 1/52; E06B 1/56
See application file for complete search history.

(56) References Cited

U.S. PATENT DOCUMENTS

| | | | | |
|---|---|---|---|---|
| 1,950,519 | A | 5/1932 | Ripley | 20/11 |
| 2,317,231 | A | 4/1943 | Swedman | 85/28 |
| 2,616,531 | A | 11/1952 | Young | 189/46 |
| 2,863,534 | A | 12/1958 | Gillespie | 189/75 |
| 3,371,702 | A | 3/1968 | Keegan et al. | 160/392 |
| 3,609,928 | A | 10/1971 | Mock | |
| 3,774,344 | A | 11/1973 | Symons | 49/504 |
| 3,991,806 | A | 11/1976 | Abell | 160/90 |
| 4,086,739 | A | 5/1978 | Hall | 52/281 |
| 4,184,297 | A | 1/1980 | Casamayor | 52/202 |
| 4,258,520 | A | 3/1981 | Rehbein | 52/522 |
| 4,330,972 | A | 5/1982 | Sailor | 52/211 |
| 4,361,979 | A | 12/1982 | Petersson | 46/26 |
| 4,407,100 | A | 10/1983 | Huelsekopf | 52/212 |
| 4,452,029 | A | 6/1984 | Sukolics | 52/747 |
| 4,454,699 | A | 6/1984 | Strobl | 52/585 |
| 4,608,796 | A | 9/1986 | Shea, Jr. | 52/399 |
| 4,665,666 | A | 5/1987 | Hampton | 52/86 |
| 4,947,597 | A | 8/1990 | Simpson | 52/208 |
| 5,003,743 | A | 4/1991 | Bifano et al. | 52/282 |
| 5,027,572 | A | 7/1991 | Purcell et al. | 52/309.9 |
| 5,062,250 | A | 11/1991 | Buzzell | 52/584 |
| 5,182,880 | A | 2/1993 | Berge, Jr. et al. | 49/504 |
| 5,261,756 | A | 11/1993 | Kohn | 403/298 |
| 5,313,755 | A | 5/1994 | Koenig, Jr. | 52/255 |
| 5,377,464 | A | 1/1995 | Mott et al. | 52/213 |

(Continued)

FOREIGN PATENT DOCUMENTS

| | | |
|---|---|---|
| JP | 11193625 A | 7/1999 |

*Primary Examiner* — Patrick J Maestri
(74) *Attorney, Agent, or Firm* — CANTOR COLBURN LLP

(57) ABSTRACT

A system, device, assembly and methods for a frame assembly, including a connector as shown and described. The assembly may be a door frame assembly and may, by way of example, be a door jamb and/or a door mullion including a connector. A connector may provide stability to the assembly.

19 Claims, 5 Drawing Sheets

(56) References Cited

U.S. PATENT DOCUMENTS

| | | | | |
|---|---|---|---|---|
| 5,378,007 | A | 1/1995 | Joyce | 280/433 |
| 5,398,468 | A | 3/1995 | Erickson | 52/282.3 |
| 5,448,864 | A | 9/1995 | Rosamond | 52/307 |
| 5,491,940 | A | 2/1996 | Bruchu | 52/213 |
| 5,528,869 | A | 6/1996 | Boomer et al. | 52/212 |
| 5,540,019 | A | 7/1996 | Beske et al. | 52/204.5 |
| 5,555,684 | A | 9/1996 | Galowitz et al. | 52/204.5 |
| 5,590,496 | A | 1/1997 | Martin et al. | 52/213 |
| 5,622,017 | A | 4/1997 | Lynn et al. | 52/209 |
| 5,669,192 | A | 9/1997 | Opdyke | 52/211 |
| 5,791,113 | A | 8/1998 | Glowa | 52/586.2 |
| 5,836,118 | A | 11/1998 | Thornton et al. | 52/204.1 |
| 6,098,365 | A | 8/2000 | Martin et al. | 52/592.1 |
| 6,125,605 | A | 10/2000 | Young | 52/717.01 |
| 6,141,874 | A | 11/2000 | Olsen | 29/897.312 |
| 6,148,584 | A * | 11/2000 | Wilson | E04F 19/0495 52/211 |
| 6,293,060 | B1 | 9/2001 | McKann et al. | 52/21 |
| 6,314,701 | B1 | 11/2001 | Meyerson | 52/588.1 |
| 6,360,508 | B1 | 3/2002 | Pelfrey et al. | 52/520 |
| 6,393,779 | B1 | 5/2002 | Boldt | 52/210 |
| 6,491,468 | B1 | 12/2002 | Hagen | 403/291 |
| 6,568,137 | B2 | 5/2003 | Ballantyne | 52/211 |
| 6,578,332 | B2 | 6/2003 | Bushberger | 52/293.3 |
| 6,588,159 | B1 | 7/2003 | Cotton, Jr. | 52/211 |
| 6,604,334 | B2 | 8/2003 | Rochman | 52/717.01 |
| 6,675,545 | B2 | 1/2004 | Chen et al. | 52/586.1 |
| 6,761,008 | B2 | 7/2004 | Chen et al. | 52/586.1 |
| 6,904,726 | B2 | 6/2005 | Heard et al. | 52/211 |
| 7,165,690 | B2 | 1/2007 | Wu | 211/192 |
| 8,276,320 | B2 | 10/2012 | Erbrect et al. | 49/471 |
| 9,010,066 | B1 | 4/2015 | Sand | 13/24 |
| 9,187,945 | B2 | 11/2015 | Back | |
| 9,222,267 | B2 | 12/2015 | Bergelin et al. | 15/2 |
| 9,249,581 | B2 | 2/2016 | Nilsson et al. | 15/10 |
| 9,260,871 | B2 | 2/2016 | Shaw | 19/61 |
| 9,387,544 | B2 | 7/2016 | Phebus et al. | 5/10 |
| 9,534,402 | B2 | 1/2017 | Shaw | 19/2 |
| 9,714,673 | B2 | 7/2017 | Phillips | 12/24 |
| 2002/0108326 | A1 | 8/2002 | Ackerman, Jr. | 52/204.5 |
| 2003/0177725 | A1 | 8/2003 | Gatherum | 52/302.1 |
| 2005/0257455 | A1 | 11/2005 | Fagan | 52/210 |
| 2006/0174577 | A1 | 8/2006 | O'Neil | 52/586.2 |
| 2007/0094985 | A1 | 5/2007 | Grafenauer | 52/582.1 |
| 2009/0013636 | A1* | 1/2009 | Wilson | E04F 19/02 52/745.15 |
| 2010/0107524 | A1 | 5/2010 | Moss | 52/204.1 |

* cited by examiner

CONNECTOR SYSTEM, APPARATUS AND METHODS FOR A DOOR FRAME ASSEMBLY

This application is a continuation of U.S. application Ser. No. 17/195,135, filed Mar. 8, 2021, which is a continuation of U.S. application Ser. No. 16/561,116, filed Sep. 5, 2019, which claims the benefit of U.S. provisional application No. 62/727,790, filed Sep. 6, 2018, which is herein incorporated by reference.

FIELD OF TECHNOLOGY

The present disclosure relates generally to doors and door assemblies for entranceways for example, for a building and, more particularly, to a door frame and connector system, device, apparatus, and/or methods for a door assembly for a residence/facility.

BACKGROUND

Joining of frame members for a door assembly is traditionally accomplished with fasteners such as staples, nails or screws. When these fastener types are used, a secondary operation is needed to hide the fastener in situations where improved aesthetics are desired. There can be opposing variables between securing a door frame and maintaining an aesthetically desirable appearance to the door assembly.

Thus, the Applicant recognized there remains a need for a new and improved connector for joining door frame members for door assemblies, and it is to these and other challenges that the inventions of the present disclosure are directed.

SUMMARY

The present disclosure is directed in one embodiment to a system, device, method and/or kit for joining of framing members for a door assembly by way of alternate fastening methods, by way of example, through a connector and an internal groove or set of grooves on adjoining frame members. In one example, the connector may mate with and be inserted into a groove of one or more frame members, when the frame members are abutted. As a connector and groove system joins the connector and groove and the connector and groove are assembled through abutment of the framing members, the connector may be hidden on an inside surface of the frame members.

In another embodiment, a frame assembly for a doorway may include a first frame member, a first set of grooves, a second frame member, a second set of grooves and a connector. The first frame member may include an outside exposed surface, and an inside surface. The first set of grooves may be recessed into the first frame member along the inside surface. The second frame member may include an outside exposed surface and an inside surface. The second groove may recess into the second frame member along the inside surface. The connector may join the first frame member and the second frame member with each other. The connector may include a first wall and a second wall. The first wall may be substantially perpendicular to the second wall.

Some embodiments may include a set of first projections extending from the first wall. The set of first projections may be spaced apart from one another and configured to align with the first set of grooves. An at least one second projection may extend from the second wall. The projection may be configured to align with the second groove.

A connector may be a hidden connector. The connector may span the inside surfaces of the first frame member and the second frame member and not be fully or partially visible from the outside surface of the frame assembly. The connector may secure the first frame member to said second frame member in an abutting position.

In other embodiments, the connector may span the inside walls of the first frame member and the second frame member but not protrude between a meeting face of the first frame member and the second frame member. The connector may extend at least halfway along the length of the first frame member and the connector may extend less than halfway along the length of the second frame member.

Some examples of a frame assembly for a doorway may include a first frame member having an outside exposed surface, an end surface, and an inside surface, and a second frame member having an outside exposed surface, an end surface, and an inside surface. A bridge member may have an outside surface, an end surface and an inside surface. A first connector may join the first frame member and the bridge with each other. A second connector may join the second frame member and the bridge with each other. The first connector, second connector and the bridge member may form a collective end wall. The first frame member and the second frame member may be spaced apart from one another by the end wall. The first connector and the second connector may be configured to include an opposed position to one another.

The first connector and the second connector may include a side cap, an end cover, an end extension piece for accepting the bridge, and an inside securing projection extending at an angle to the frame member. The inside securing projection may attach the respective connector to the respective inside surface of each respective frame member.

In some instances, the end cover of the first connector and the end cover of the second connector extend in a first plane with the securing projection for each frame member extending non-perpendicularly to the first plane. The securing projection of each first connector and second connector may extend from the first plane from at a range of an angle alpha. The angle alpha may be a 90 degree angle. The angle alpha may be in a range of between 70 and 100 degrees. The angle alpha, in other examples, may extend between a range of between 80 and 90 degrees. The listed ranges are exemplary and the angle alpha could include other dimensions, ranges and/or any of the ranges within or outside of those listed as examples.

The first connector and the second connector may be separated from one another by said bridge member. The first connector and the second connector may extend from one another. The first connector and second connector may form one piece.

In some examples, a frame member may be a jamb, a mullion, a bridge, a trim piece, and/or a combination of any of these listed.

The inventions of the present disclosure include forming a mullion by way of a set of opposing jambs, a set of opposing extenders and a bridge.

Other examples include a frame assembly including an end wall forming a complete end cap covering the first and second frame members. There may be a space formed in-between, and the projection for the first connector and the second connector may be encased inside an interior space between the first frame member inside surface and the second frame member inside surface.

The inventions of the present disclosure may be considered a method for securing a doorway frame joint by way of any of the embodiments disclosed herein.

The inventions of the present disclosure may be considered a connector for a door frame according to any of the embodiments disclosed herein.

These and other aspects of the inventions of the present disclosure will become apparent to those skilled in the art after a reading of the following description of embodiments when considered with the drawings.

DESCRIPTION OF EMBODIMENTS

Figure 1A:
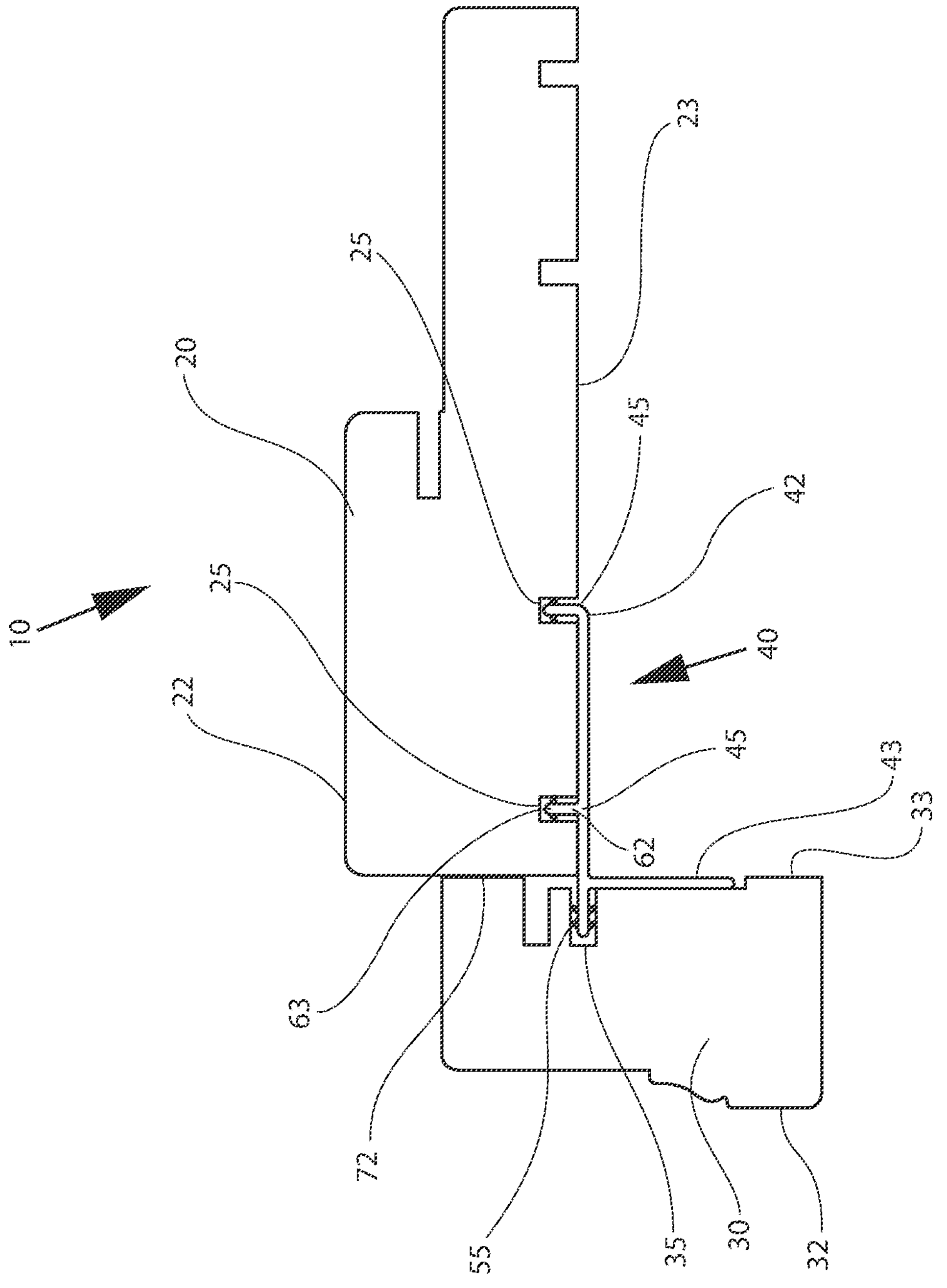
FIG. 1A is a cross-sectional view of one embodiment of a frame assembly for a door constructed according to the present disclosure.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general, it will be understood that the illustrations are for the purpose of describing a preferred embodiment of the inventions and are not intended to limit the inventions thereto. A door frame often includes one or more frame members. A plurality of frame members may include any combination of a header, a sill, mullion components, jamb components, and/or a trim component. A header may be generally placed toward the top of a door assembly. Mullions and jambs components may be generally placed at opposing sides of a door panel. Frame assemblies may also include hinges for connecting door panels to at least one of the frame members. The frame assembly may also include locking hardware that enables the door to be secured to as least one of the frame members and/or to another frame member. Locking hardware, by way of example, may include latch and deadbolt plates.

Figure 1B:
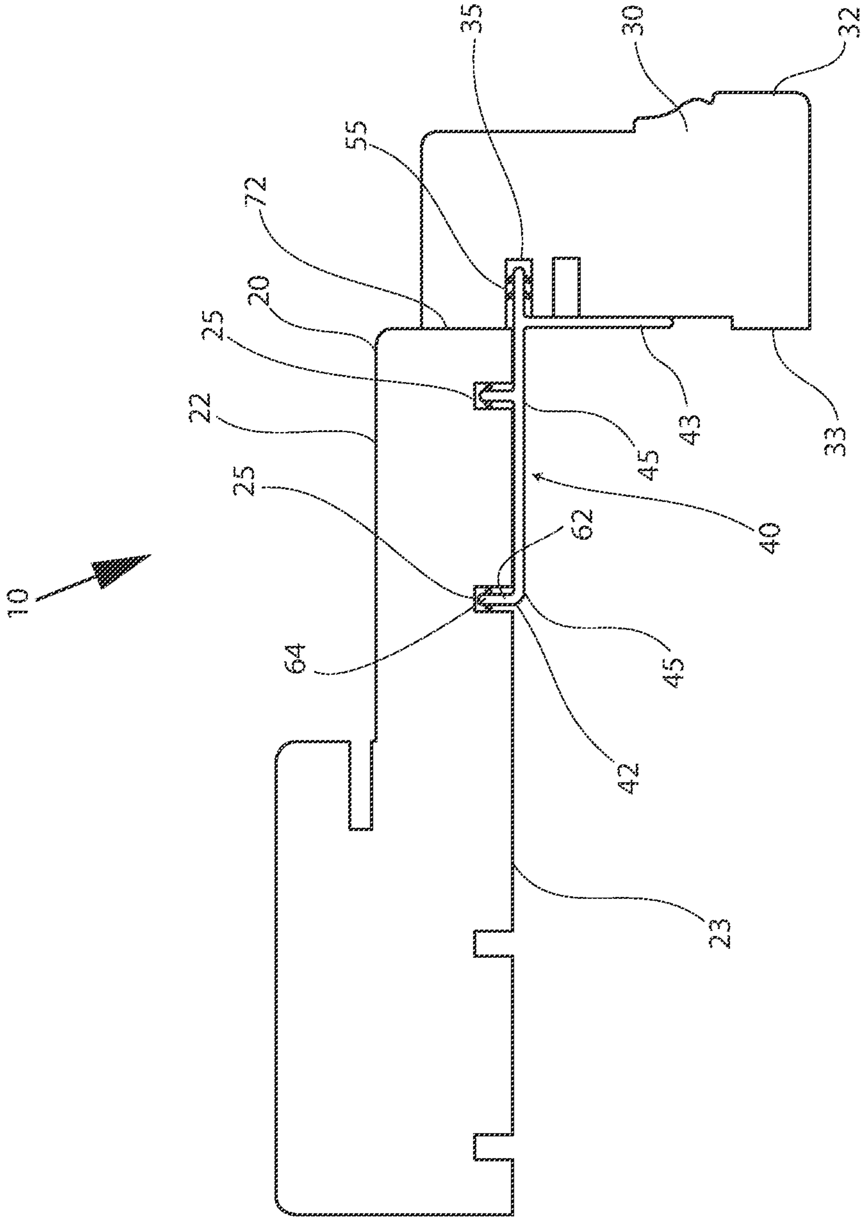
FIG. 1B is a cross-sectional view of another embodiment of a frame assembly for a door frame constructed according to the present disclosure.
Figure 2:
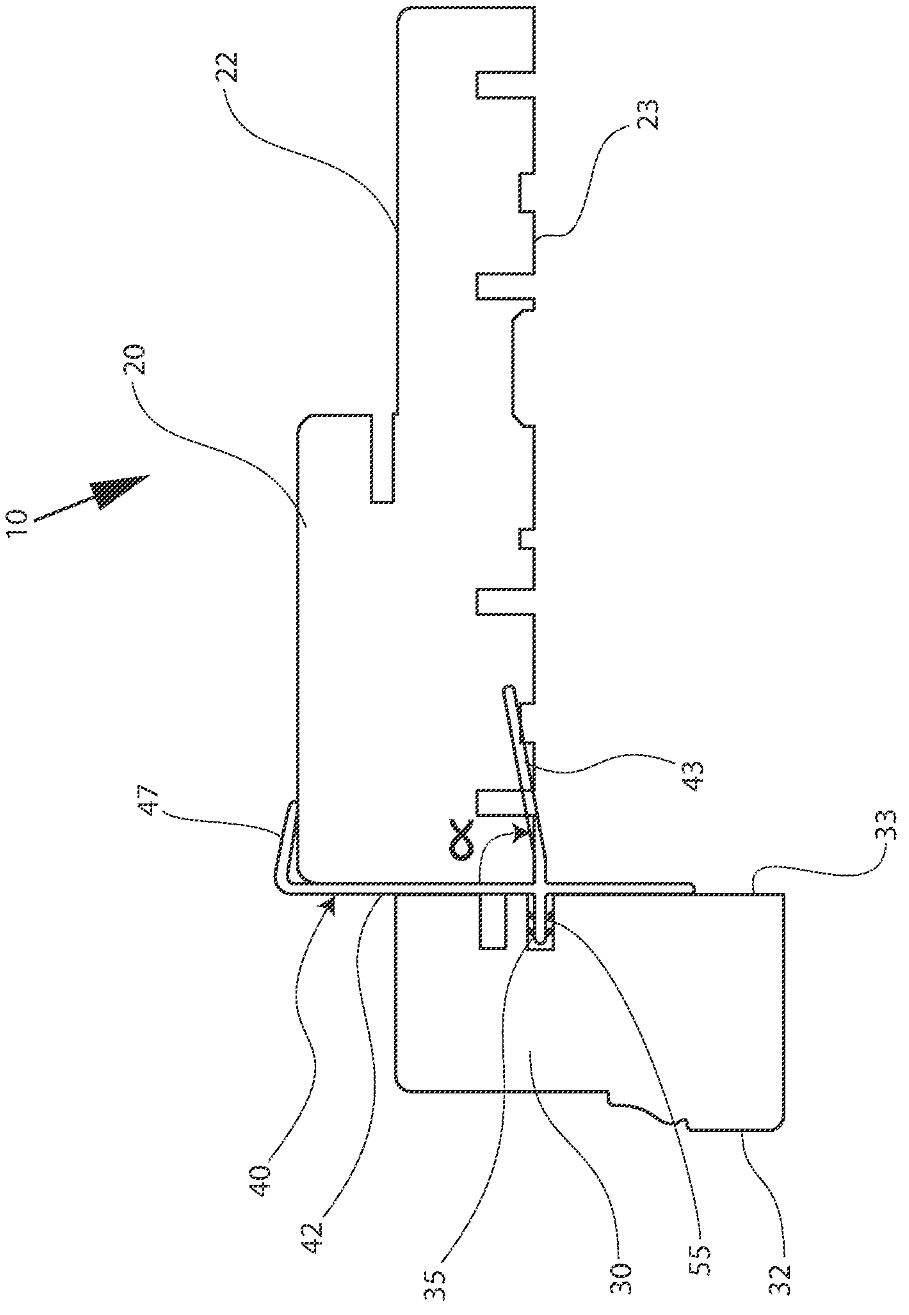
FIG. 2 is a side view of another embodiment of a frame assembly for a door frame constructed according to the present disclosure.

FIGS. 1A, 1B, and 2 show, in one embodiment, a door frame assembly 10 for a door frame. A frame assembly 10 for a doorway may include a first frame member 20 having a first set of grooves 25, a second frame member 30 having a second set of grooves 35, and a connector 40. The first frame member 20 may include an outside exposed surface 22, and an inside surface 23. The first set of grooves 25 may be recessed into the first frame member 20 along the inside surface 23. The second frame member 30 may include an outside exposed surface 32 and an inside surface 33. The second groove 35 may recess into the second frame member 30 along the inside surface 33.

The connector 40 may assist in joining the first frame member and the second frame member with each other. The connector 40 may include a first wall 42 and a second wall 43. The first wall may be substantially perpendicular to the second wall.

A connector 40 may be a hidden connector. The connector 40 may span the inside surfaces 23, 33, of the first frame member 20 and the second frame member 30 and not be fully or partially visible from the outside surfaces of the frame assembly 22, 32. The connector 40 may secure the first frame member 20 to the said second frame member 30 in an abutting position.

In other embodiments, the connector 40 may span the inside walls 23, 33 of the first frame member 20 and the second frame member 30 but not protrude between a meeting face 72 of the first frame member 20 and the second frame member 30. The connector 40, in some embodiments, may extend at least halfway along the length of the first frame member 20, and may extend less than halfway along the length of the second frame member 30. The first wall 42 may be longer than the second wall 43. The second wall may or may not include second projections 55. The second projection 55 may be an extension of the first wall 42 that extends past an intersection with the second wall 43.

Some embodiments may include a set of first projections 45 extending from the first wall 42. The set of first projections 45 may be spaced apart from one another and configured to align with the first set of grooves 25. An at least one second projection 55 may extend from the second wall 43. The projection 55 may be configured to align with the second groove 35. Projections 45, may be linear projections. Projections 45, 55 may include an attachment end 62 and a terminating end 63. Projections 45, 55 may include one or a set of barbs 64. The barbs 64 may be positioned between the attachment end 62 and the terminating end 63. The barbs may be made of coextruded flexible material to help maintain engagement of the projections 45, 55 within the grooves.

Projections 45, 55, in some examples, may include a first set of projections 45 oriented and/or pointing in one direction and a second projection 55 oriented and/or pointing in a different, second direction.

In some examples, a second projection 55 may extend linearly along a same plane as a first wall 42. The second projection 55 may project beyond a plane formed by the second wall 43.

The frame assembly may, by way of example, be configured to form a trisecting jointed wall between the first frame member 20, second frame member 30 and connector 40, one example as shown in FIG. 2.

Figure 3:
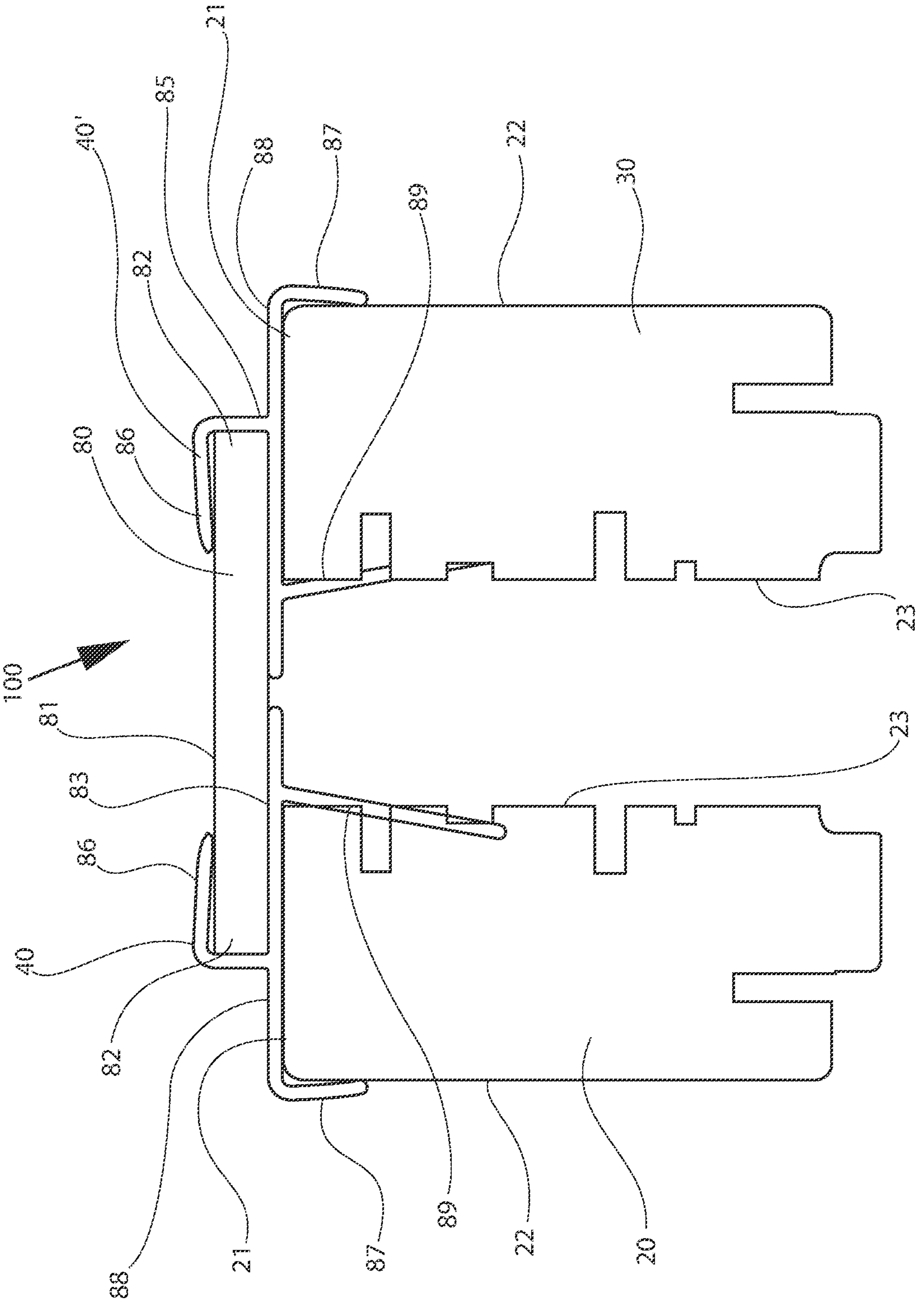
FIG. 3 is a side view of another embodiment of frame assembly for a mullion door frame constructed according to the present disclosure.

Some examples of a frame assembly 100 for a doorway, one example of which is seen in FIG. 3, may include a first frame member 20 having an outside exposed surface 22, an end surface 21, and an inside surface 23, and a second frame member 30 having an outside exposed surface 22, an end surface 21, and an inside surface 23. A bridge member 80 may have an outside surface 81, an end surface 82, and an inside surface 83. A first connector 40 may join the first frame member 20 and the bridge member 80 with each other. A second connector 40' may join the second frame member 30 and the bridge member 80 with each other. The first connector second connector 40' and the bridge member 80 may form a collective end wall 85. The first frame member 20 and the second frame member 30 may be spaced apart from one another by at least a portion of the end wall 85. The first connector 40 and the second connector 40' may be configured to take on an opposed position configuration to one another.

The first connector 40 and/or the second connector 40' may include a side cap 87, an end cover 88, and an end extension piece 86 for accepting the bridge member 80, and an inside securing projection 89 extending at an angle to the frame member 20, 30. The inside securing projection 89 may attach the respective connector 40, 40' to the respective inside surface 23 of each respective frame member. The projection 89 may be secured to the frame member by a fastener, such as, by way of example, a staple, adhesive, or a nail.

In some instances, the end cover 88 of the first connector 40 and the end cover 88 of the second connector 40' extend in a first plane with the securing projection 89 for each frame member extending non-perpendicularly to the first plane. The securing projection 89 of each first connector 40 and second connector 40' may extend from the first plane from at a range of an angle alpha. The angle alpha may be a 90 degrees angle. The angle alpha may be in a range of between 70 and 100 degrees. The angle alpha, in other examples, may extend between a range of between 80 and 90 degrees. The listed ranges are exemplary and the angle alpha could include other dimensions, ranges and/or any of the ranges within or outside of those listed as examples.

The first connector 40 and the second connector 40' may be separated from one another by a length of the bridge member 80. The first connector 40 and the second connector 40' may extend from one another. The first connector and second connector may form one piece.

In some examples, a frame member assembly may be a jamb, a mullion, a bridge, a trim piece, and/or a combination of any of these listed.

The inventions of the present disclosure include forming a mullion by way of a set of opposing jambs, a set of opposing extenders and a bridge.

In some examples, an extension piece for accepting the bridge member 80 forms a U-shaped acceptor.

Figure 4:
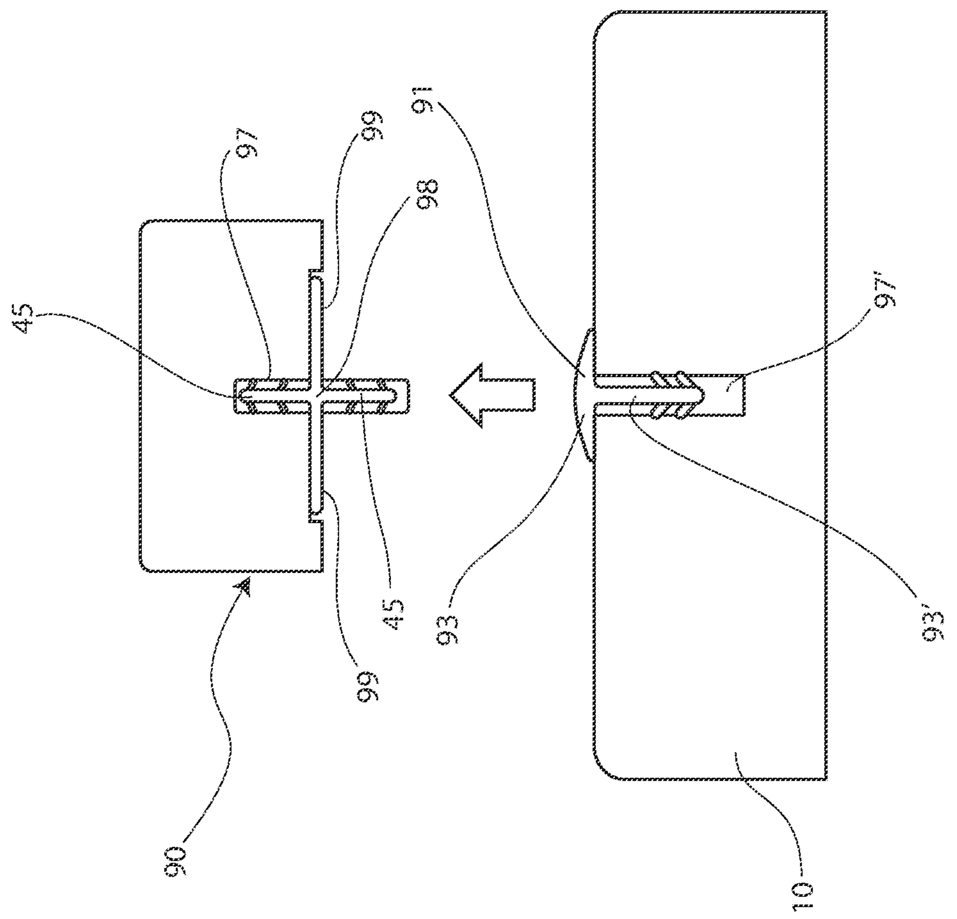
FIG. 4 is a side view of one example of a groove cover and extension for a frame member according to the present disclosure.

In examples of a frame assembly 10, for example, a jamb or a mullion, an extension member 90 may be included and may attach to a frame assembly 10, an example of an extension being partially shown in FIG. 4. The extension member 90 may include a groove 97. The frame member 10 may include a groove 97'. When a groove is not in use in the frame member 10, a groove cover 91 may be utilized and fitted into the groove. The groove cover may have a top 93 that covers a groove opening and a groove cover projection 93'. The groove cover may take on a configuration similar to the projections as disclosed herein. A joint extension 98 may alternatively project into groove 97 and on one side and groove 97' on an opposite side. The joint extension 98 may include projections 45, and may have arms 99 that extend, in some examples, perpendicularly to projections 45. The joint extension 98 may serve to secure the frame member 10 to the extension member 90.

Other examples of the enclosed embodiments include a frame assembly 100 including an end wall forming a complete end cap covering the first 20 and second frame members 30. There may be a space formed in-between the frame members 20, 30, and the projection 89 for the first connector 40 and the second connector 40' may be encased inside an interior space between the first frame member inside surface 23 and the second frame member inside surface 23. The projection 89 may an interior space and also extend into the inside surface 23 respectively of first frame member 20 and second frame member 30.

The inventions of the present disclosure may be considered a method for securing a doorway panel joint by way of any of the embodiments disclosed herein.

The inventions of the present disclosure may be considered a connector for a door panel according to any of the embodiments disclosed herein.

Certain modifications and improvements will occur to those skilled in the art upon a reading of the foregoing description. It should be understood that all such modifications and improvements have been deleted herein for the sake of conciseness and readability but are properly within the scope of the following claims.

I claim:

1. A frame assembly for a doorway, the frame assembly comprising:
- a first frame member having an outside surface and an inside surface opposite the outside surface;
- a second frame member having an outside surface and an inside surface opposite the outside surface, the second frame member separated from the first frame member;
- a bridge member having an outside surface, an inside surface opposite the outside surface, a first end surface, and a second end surface opposite the first end surface, the first end surface and the second end surface each extending between the outside surface and the inside surface of the bridge member; and
- a connector joining the first frame member and the second frame member with each other, the connector comprising:
  - a first connector portion securing the first frame member to the bridge member; and
  - a second connector portion attaching the second frame member to the bridge member, the second connector portion facing the first connector portion;
- wherein the bridge member and the connector extend from the outside surface of the first frame member to the outside surface of the second frame member to form an end cap.

2. The frame assembly according to claim 1, wherein the bridge member spans a length between the first frame member and the second frame member.

3. The frame assembly according to claim 1, wherein the first connector portion includes a first securing projection and the second connector portion includes a second securing projection.

4. The frame assembly according to claim 3, wherein the first securing projection extends at a first angle relative to the inside surface of the first frame member and the second securing projection extends at a second angle relative to the inside surface of the second frame member.

5. The frame assembly according to claim 4, wherein the first connector portion covers the first end surface of the bridge member and the second connector portion covers the second end surface of the bridge member.

6. The frame assembly according to claim 1, wherein the bridge member covers an opening defined between the first connector portion and the second connector portion.

7. The frame assembly according to claim 1, wherein the first frame member and the second frame member are spaced apart from one another by the bridge member.

8. The frame assembly according to claim 7, wherein the first connector portion and second connector portion are spaced apart from one another by the bridge member.

9. The frame assembly according to claim 1, wherein the inside surface of the first frame member is opposed to the inside surface of the second frame member.

10. A frame assembly for a doorway, comprising:
- a first frame member having an outside surface, an end surface, and an inside surface opposite the outside surface, the end surface extending between the outside surface and the inside surface;

a second frame member having an outside surface, an end surface, and an inside surface opposite the outside surface, the end surface extending between the outside surface and the inside surface;

a bridge member having an outside surface, an inside surface opposite the outside surface, a first end surface, and a second end surface opposite the first end surface, the first end surface and the second end surface each extending between the outside surface and the inside surface of the bridge member;

a first connector joining the first frame member and the bridge member with each other;

a second connector joining the second frame member and the bridge member with each other, the second connector opposed to the first connector the first frame member and the second frame member spaced apart from one another by an end wall formed of the first connector, the second connector, and the bridge member, each of the first connector and the second connector including:

a side cap;

an end cover;

an end extension piece for accepting the bridge member, the end extension piece of the first connector and the second connector wrapped about the first end surface and the second end surface of the bridge member respectively; and an inside securing projection extending at an angle to a respective frame member, the inside securing projection attaching the respective connector to the inside surface of the respective frame member.

11. The frame assembly according to claim 10, wherein the inside securing projection of the first connector extends non-perpendicularly from the end cover of the first connector at a first angle.

12. The frame assembly according to claim 11, wherein the inside securing projection of the second connector extends from the end cover of the second connector at a second angle, the first angle and the second angle being the same.

13. The frame assembly according to claim 10, wherein the bridge member separates the first connector from the second connector.

14. The frame assembly according to claim 10, wherein the first frame member is a jamb.

15. The frame assembly according to claim 14, wherein the second frame member is a jamb.

16. The frame assembly according to claim 15, wherein the frame assembly forms a jamb, a mullion, a bridge, a trim piece, or a combination thereof.

17. The frame assembly according to claim 10, wherein the end extension piece of the first connector or the second connector forms a U-shape.

18. The frame assembly according to claim 10, wherein the end wall forms a complete end cap that extends from the outside surface of the first frame member to the outside surface of the second frame member.

19. A frame assembly for a doorway, comprising:

a first frame member having an outside surface and an inside surface opposite the outside surface;

a second frame member having an outside surface and an inside surface opposite the outside surface; and a connector joining the first frame member and the second frame member with one another such that the first frame member is separated from the second frame member, the connector including a first wall and a second wall, the first wall and the second wall each having a terminal end, a first projection, and a second projection, the first projection of the first wall interfaces with the inside surface of the first frame member and the first projection of the second wall interfaces with the inside surface of the second frame member, the second projection of the first wall extends from the terminal end of the first wall and interfaces with the outside surface of the first frame member and the second projection of the second wall extends from the terminal end of the second wall and interfaces with the outside surface of the second frame member.

* * * * *